(12) United States Patent
Park et al.

(10) Patent No.: US 7,180,838 B2
(45) Date of Patent: Feb. 20, 2007

(54) OPTICAL PICKUP APPARATUS WITH SINGLE LIGHT SOURCE MODULE

(75) Inventors: Young-sun Park, Yongin-si (KR); Bong-gi Kim, Suwon-si (KR); Soo-han Park, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 510 days.

(21) Appl. No.: 10/389,933

(22) Filed: Mar. 18, 2003

(65) Prior Publication Data

US 2003/0179680 A1 Sep. 25, 2003

(30) Foreign Application Priority Data

Mar. 19, 2002 (KR) ................. 2002-14708

(51) Int. Cl.
*G11B 7/135* (2006.01)
(52) U.S. Cl. .............. 369/44.41; 369/120; 369/112.04; 369/47.25
(58) Field of Classification Search ..................... None
See application file for complete search history.

(56) References Cited

U.S. PATENT DOCUMENTS

| 6,072,607 A * | 6/2000 | Tajiri et al. ................... 359/15 |
| 6,906,991 B1 * | 6/2005 | Yukawa .................. 369/112.05 |
| 6,937,554 B2 * | 8/2005 | Ohuchida .............. 369/112.15 |

FOREIGN PATENT DOCUMENTS

| EP | 1041546 A1 * | 10/2000 |
| JP | 09-097448 | 4/1997 |
| JP | 11-039705 | 2/1999 |
| JP | 2000-207766 | 7/2000 |
| JP | 2001-176106 | 6/2001 |
| JP | 2001-209957 | 8/2001 |
| JP | 2001-216677 | 8/2001 |
| JP | 2001-222825 | 8/2001 |
| JP | 2001-338432 | 12/2001 |
| JP | 2001-344800 | 12/2001 |
| JP | 2002-063732 | 2/2002 |

* cited by examiner

*Primary Examiner*—William Korzuch
*Assistant Examiner*—Joseph Haley
(74) *Attorney, Agent, or Firm*—Staas & Halsey LLP

(57) ABSTRACT

An optical pickup apparatus includes a light source module which emits a light beam, a beam splitter which reflects or transmits the light beam emitted from the light source module, an objective lens which focuses the light beam passing through the beam splitter onto a disc, and a photodetector which receives and detects the light beam reflected by the disc, wherein the light source module includes a first light source and a second light source that emit first and second light beams having different wavelengths and are formed into a single module. The optical pickup apparatus further includes a first grating which divides the first light beam emitted from the first light source into three beams of the first light beam and transmits the second light beam emitted from the second light source, and a second grating which transmits the first light beam emitted from the first light source and divides the second light beam emitted from the second light source into three beams of the second light beam. Since the first and second light sources are formed into a single light source module, the number of parts of the optical pickup apparatus can be reduced, and the efficiency of light is improved.

20 Claims, 8 Drawing Sheets

OPTICAL PICKUP APPARATUS WITH SINGLE LIGHT SOURCE MODULE

CROSS-REFERENCE TO RELATED APPLICATIONS

This application claims the priority of Korean Patent Application No. 2002-14708 filed Mar. 19, 2002 in the Korean Intellectual Property Office, the disclosure of which is incorporated herein in its entirety by reference.

BACKGROUND OF THE INVENTION

1. Field of the Invention

The present invention relates to an optical pickup apparatus, and more particularly, to an optical pickup apparatus in which the productivity and efficiency of light are improved by reducing the number of parts thereof.

2. Description of the Related Art

FIG. 1 shows a conventional compatible optical pickup apparatus which records/reproduces data with respect to a disc. The optical pickup apparatus includes a first light holder 105 and a second light holder 115. The first light holder 105 includes a first light source 100 which emits a light beam having a wavelength of about 650 nm and a first grating 103 which divides the light beam from the first light source 100 into three light beams to facilitate a servo tracking or a servo focusing. The first light source 100 and the first grating 103 are integrally formed. The second holder 115 includes a second light source 110 which emits a light beam having a wavelength of about 780 nm and a second grating 113 which divides the light beam from the second light source 110 into three light beams to facilitate a servo tracking or a servo focusing. The second light source 115 and the second grating 113 are integrally formed.

The first light holder 105 and the second light holder 115 are independently arranged at different positions. The first light source 100 is used for a disc 107 such as a DVD having a relatively thin thickness while the second light source 100 is used for a disc 117 such as a CD having a relatively thick thickness.

The light beam emitted from the first light source 100 is reflected by a first beam splitter 120, passes through a second beam splitter 123, and proceeds toward the relatively thin disc 107. Then, the light beam is reflected by the relatively thin disc 107, passes through the first and second beam splitters 120 and 123, and is received by a photodetector 130.

A reflection mirror 125 which changes paths of the light beams emitted from the first and second light sources 100 and 110, a collimating lens 127 which makes an incident light beam parallel, and an objective lens 129 which focuses the incident light beam onto the disk 107/117 are provided on an optical path between the second beam splitter 123 and the disc 107/117.

The light beam emitted from the second light source 110 passes through the second grating 113, is sequentially reflected by the second beam splitter 123 and the reflection mirror 125, and passes through the collimating lens 127 and the objective lens 129, thus forming a light spot on the relatively thick disc 117. Then, the light reflected by the relatively thick disc 117 passes through the objective lens 129 and the collimating lens 127, is reflected by the reflection mirror 125, passes through the second and first beam splitters 123 and 120, and is received by the photodetector 130.

Here, the first and second beam splitters 120 and 123 respectively split the light beams emitted from the first and second light sources 100 and 110 into approximately 50:50 and use only 50% of the received light, so that the efficiency of light is very low.

An astigmatism lens 132 is provided between the first beam splitter 120 and the photodetector 130. The astigmatism lens 132 does not have a uniform curvature, but has different curvatures in vertical and horizontal directions to generate an astigmatism. The astigmatism lens 132 is arranged at an angle in a direction opposite to a direction in which the first beam splitter 120 is inclined, such that the size of the light beam focused on the photodetector 130 is increased by the interaction with the collimating lens 129, and a coma aberration generated with respect to the light beam that passes through the first beam splitter 120, is increased. Also, the curvatures of a lens surface in the vertical and horizontal directions are formed to be different from each other to generate the astigmatism. Here, a focusing error is detected in an astigmatism method by using the astigmatism generated as described above.

The light beams emitted from the first and second light sources 100 and 110 are respectively divided into three light beams by the first and second gratings 103 and 113. A focusing error is detected by using the three light beams in a differential push-pull method with respect to the relatively thin disc 107 and in a three-beam method or push-pull method with respect to the relatively thick disc 117. Since the differential push-pull method, the three-beam method, and the push-pull method are well-known techniques in the art, detailed descriptions thereof will be omitted herein.

Accordingly, CDs and DVDs can be compatibly recorded/reproduced by a single pickup apparatus having the above structure. However, since the conventional optical pickup apparatus has a separate light source and a separate grating for a CD and for a DVD, as well as two beam splitters, the number of parts increases. Therefore, the cost is raised, and portions of the pickup apparatus require numerous adjustments for an optical alignment. Accordingly, the productivity is lowered and a fraction defective is relatively high compared to a case having less number of parts. In other words, parts adopted in an optical pickup apparatus are designed according to a focal distance and optical length of a lens, and positions of the respective optical parts are determined accordingly thereafter. Here, an allowance in design or manufacture is unavoidably generated at the respective parts. Also, as the number of parts increases, allowance of each part increases. Thus, a light beam emitted from a light source in an above optical pickup apparatus does not accurately focus on a disc, thereby deteriorating a sensitivity of a signal thereof. Furthermore, where the light beam focuses on the disc, asymmetrically, a difference in the quantity of light is generated according to the position of the light beam so that the light beam focused on a photodetector becomes asymmetric and jitter increases.

Additionally, a motor which rotates a disc and chips may be presented in a layer where the optical pickup apparatus is installed. Thus, heat is generated from the motor or chips during a reproduction of a disc. In some cases, the internal temperature rises up to 60° C. even though a fan to cool the heat is installed. However, since parts inside the conventional pickup apparatus are attached by a UV bond, a portion attached by the UV bond is twisted or bulged by the high temperature. Accordingly, positions of the optical parts change and they are deviated from an optical axis so that the signal reproduction performance is lowered. Thus, it is necessary to reduce the portions, where the parts are attached by the UV bond, by reducing the number of parts in the optical pickup apparatus.

Also, a reflectance ratio of a light beam of a recordable disc is low due to its material, compared to a read-only disc. Accordingly, since the quantity of light that is reflected is small, it is disadvantageous in terms of detecting a signal, and the signal detection is affected more by noise. Thus, a light source used for a recordable disc must have a higher power than that of a light source used for a read-only disc. To increase optical power, as shown in FIG. 2B, a single mode laser light source is used. However, while the single mode laser light source may be effective in increasing the optical power, it is disadvantageous in terms of removing the effect by noise.

To reduce the noise, as shown in FIG. 2A, a multi-mode laser light source is used. A multi-mode laser light source having a high optical power for use as a laser light source having a wavelength of 780 nm has been developed. However, presently, it is difficult to manufacture a multi-mode laser light source having a high power for use as a laser light source having a wavelength of 650 nm. To solve the above problem, an HFM (high-frequency modulation), that is, a high frequency apparatus, is used for a multi-mode. However, where the high frequency apparatus is used, since a high frequency is dangerous to a human body, an electromagnetic shielding apparatus is necessarily added to protect the human body from the high frequency. This in turn increases the number of parts, and the dimension of an apparatus having the same is increased. Furthermore, where care is not taken to completely shield the high frequency, a user may be exposed to a very dangerous situation.

In addition, where a disc having a large birefringence is reproduced, since the conventional optical pickup apparatus does not have an apparatus to reduce a change in polarization according to a birefringence, a reproduction performance thereof is significantly deteriorated.

SUMMARY OF THE INVENTION

Accordingly, it is an aspect of the present invention to provide an optical pickup apparatus in which first and second light sources that emit light beams having different wavelengths are formed into a single module.

Another aspect of the present invention is to provide an optical pickup apparatus having a multi-purpose grating which is commonly used by first and second light sources.

Yet another aspect of the present invention is to provide an optical pickup apparatus having a polarizing beam splitter and a ¼ wave plate which improves the efficiency of light and provides an adaptability to a birefringence disc.

Additional aspect and advantages of the invention will be set forth in part in the description which follows and, in part, will be obvious from the description, or may be learned by practice of the invention.

To achieve the above and/or other aspects of the present invention, there is provided an optical pickup apparatus for recording/reproducing with respect to a disc, comprising a light source module which emits a light beam, a beam splitter which reflects or transmits the light beam emitted from the light source module, an objective lens which focuses the light beam passing through the beam splitter onto the disc, and a photodetector which receives and detects the light beam reflected by the disc, wherein the light source module includes a first light source and a second light source that emit first and second light beams having different wavelengths and are formed into a single module. The optical pickup apparatus further comprises a first grating which divides the first light beam emitted from the first light source into three beams of the first light beam and transmits the second light beam emitted from the second light source, and a second grating which transmits the first light beam emitted from the first light source and divides the second light beam emitted from the second light source into three beams of the second light beam.

The first and second gratings may be integrally formed.

The optical pickup apparatus may further comprise a collimating lens which makes the light beam parallel, and is provided between the beam splitter and the objective lens.

The photodetector may comprise a first photodetector which detects the first light beam and a second photodetector which detects the second light beam.

The first photodetector may comprise a main photodetector having a main four-division structure and sub-photodetectors, each having a sub four-division structure, arranged at both sides of the main photodetector.

A depth of a pattern of the first grating may be 1.51 µm and a depth of a pattern of the second grating may be 1.23 µm.

To achieve the above and/or other asepcts of the present invention, there is provided another optical pickup apparatus for recording/reproducing with respect to a disc, comprising a light source module which emits a light beam, a polarizing beam splitter which selectively reflects or transmits the light beam emitted from the light source module according to a direction in which the light beam is polarized, a ¼ wave plate which converts a polarization of the light beam passing through the polarizing beam splitter, an objective lens which focuses the light beam passing through the ¼ wave plate onto the disc, and a photodetector which receives and detects the light beam reflected by the disc, wherein the light source module includes a first light source and a second light source that emits first and second light beams having different wavelengths and are formed into a single module. The optical pickup apparatus further comprises a first grating which divides the first light beam emitted from the first light source into three beams of the first light beam and transmits the second light beam emitted from the second light source, and a second grating which transmits the first light beam emitted from the first light source and divides the second light beam emitted from the second light source into three beams of the second light beam.

BRIEF DESCRIPTION OF THE DRAWINGS

These and/or other objects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
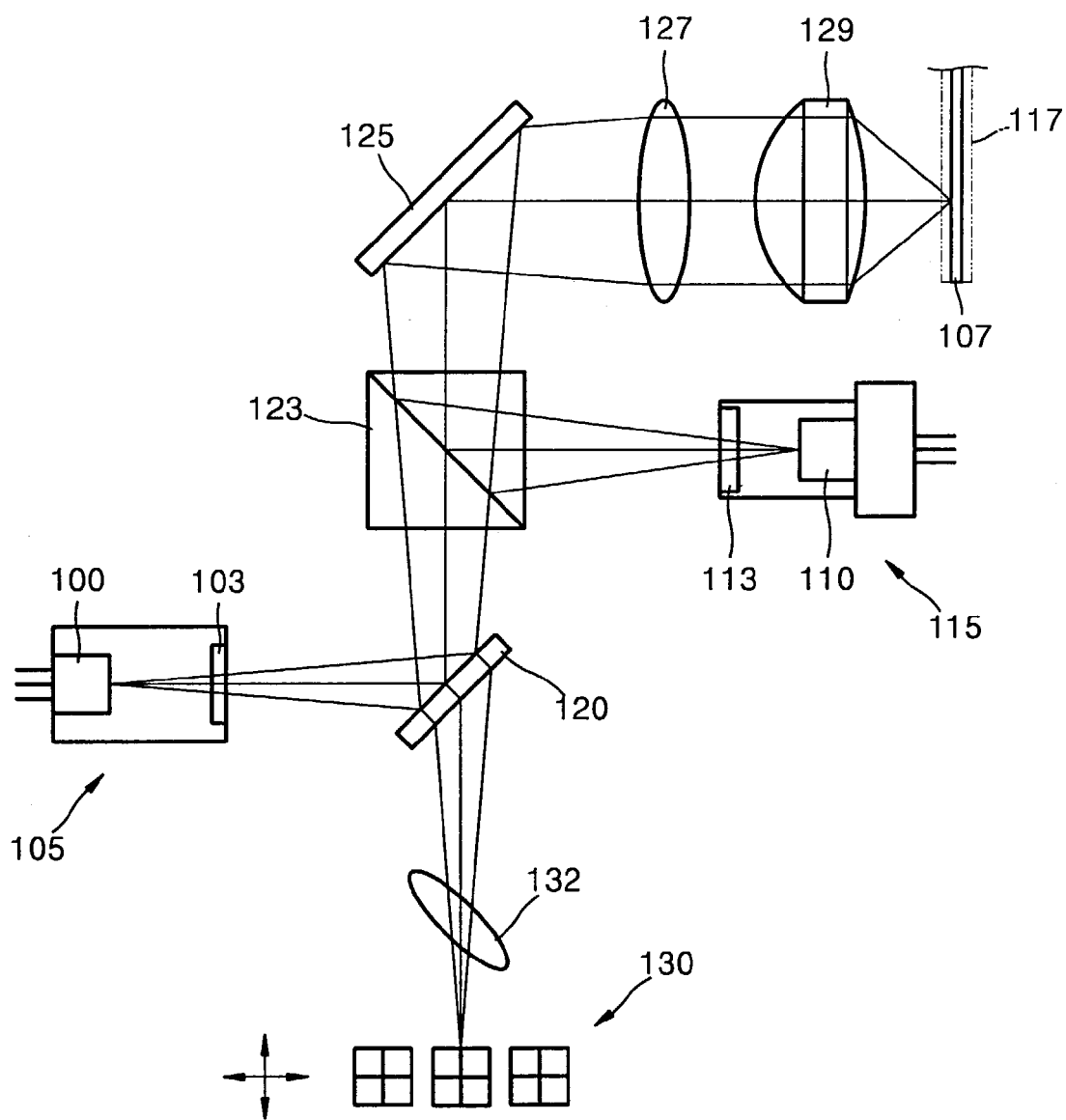
FIG. 1 is a view illustrating the configuration of a conventional optical pickup apparatus.
Figure 2A:
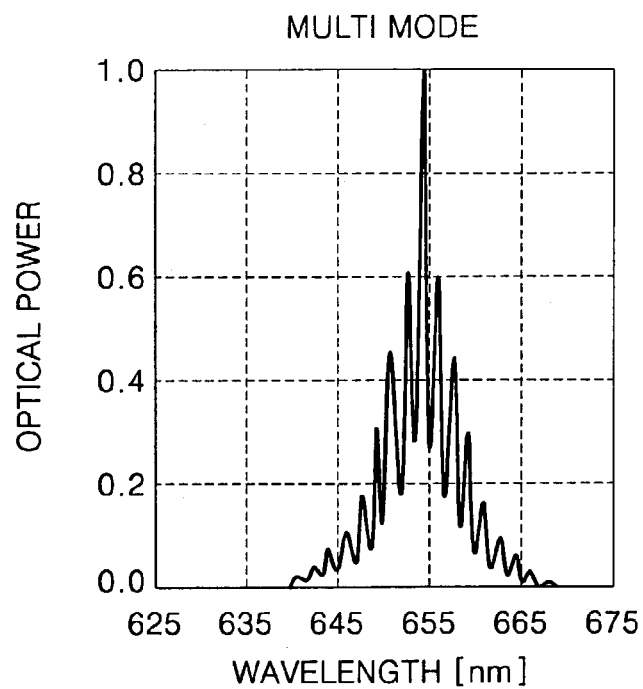
FIG. 2A is a graph showing a multi-mode of a laser light source.
Figure 2B:
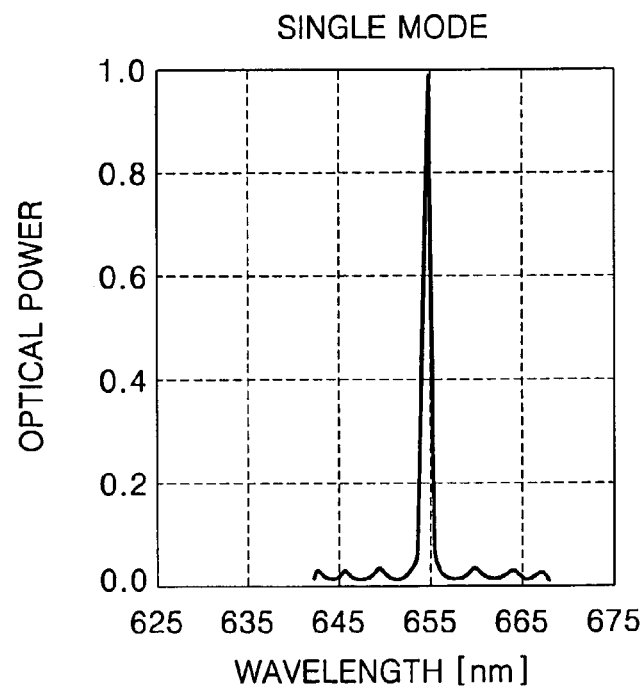
FIG. 2B is a graph showing a single mode of a laser light source.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 3:
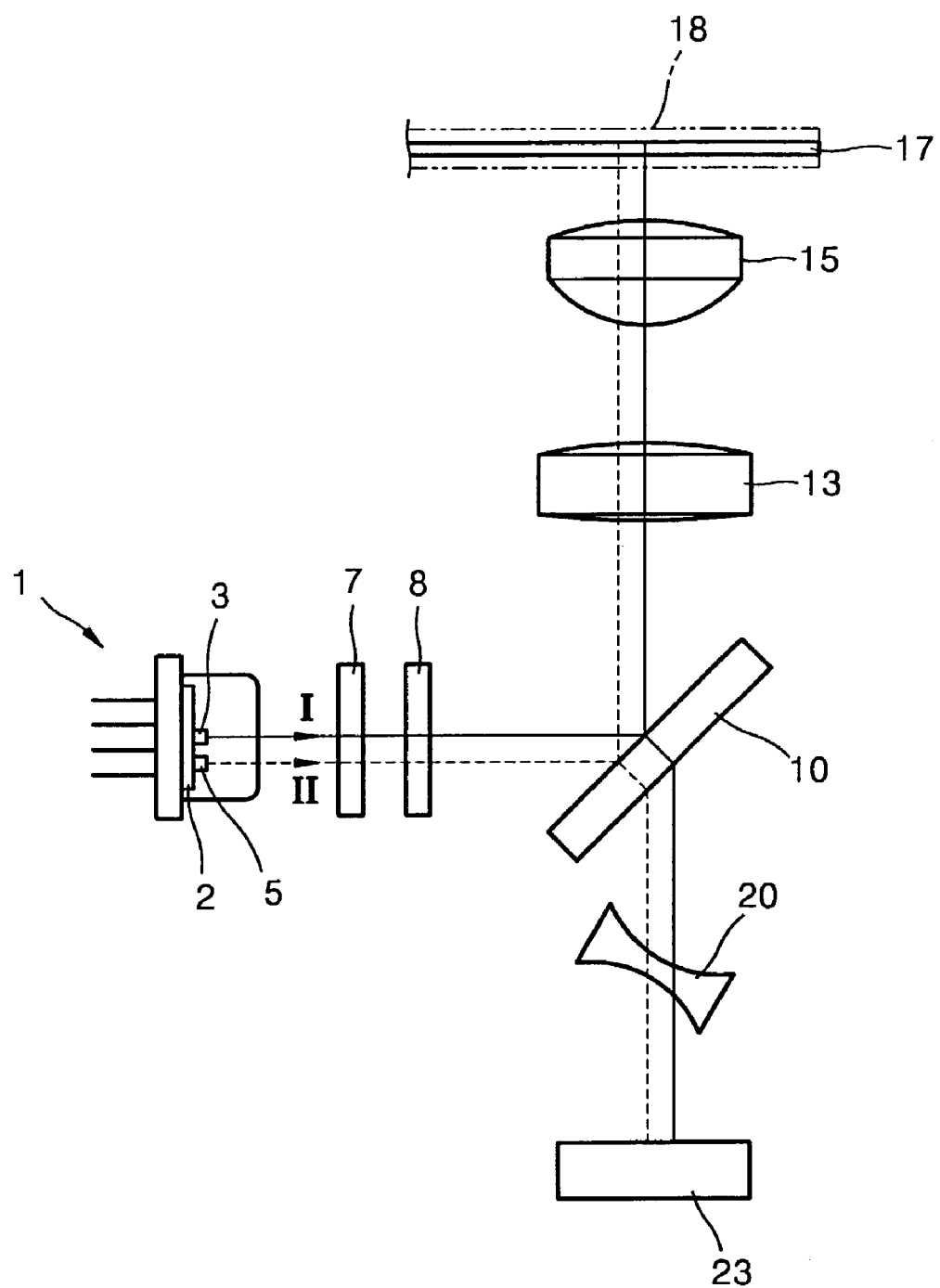
FIG. 3 is a view illustrating the configuration of an optical pickup apparatus according to an embodiment of the present invention.

FIG. 3 shows an optical pickup apparatus according to an embodiment of the present invention. The optical pickup apparatus includes a light source module 1 having first and second light sources 3 and 5, for light beams having different wavelengths, a beam splitter 10 which reflects or transmits a light beam emitted from the light source module 1 to change an optical path thereof, an objective lens 15 which focuses the light beam reflected by the beam splitter 10 on a relatively thin disc 17 or a relatively thick disc 18, and a photodetector 23 which receives and detects the light beam reflected by the discs 17 and 18.

In the light source module 1, the first light source 3 and the second light source 5 are mounted on a mount 2. The first light source 3 is, for example, a laser diode which emits a light beam having a 650 nm wavelength, and is used for the relatively thin disc 17, for example, a DVD. The second light source 5 is, for example, a laser diode which emits a light beam having a 780 nm wavelength, and is used for the relatively thick disc 18, for example, a CD. The first and second light sources 3 and 5 are arranged to be separated by, for example, about (110±2)μm.

Figure 4:
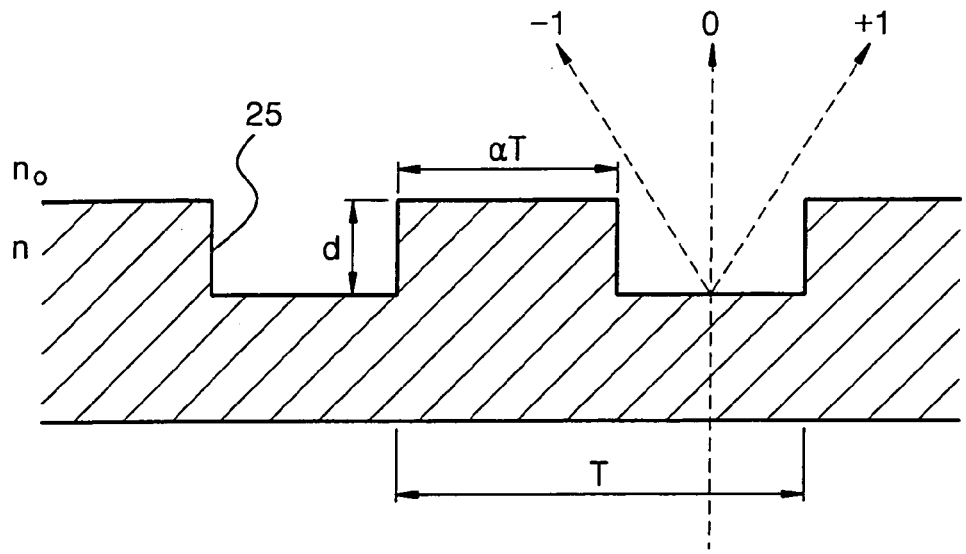
FIG. 4 is a view showing a pattern of a typical grating.

A first grating 7 which divides the light beam emitted from the first light source 3 into three beams and a second grating 8 which divides the light beam emitted from the second light source 5 into three beams are provided on an optical path between the light source module 1 and the beam splitter 10. The first grating 7 is manufactured to transmit over 90% of the light beam emitted from the second light source 5. The second grating 8 is manufactured to transmit over 90% of the light beam emitted from the first light source 3.

Where a pattern of a grating as shown in FIG. 4 is formed, the following transmission equation can be obtained:

$$I = |Tm^2| = \frac{4}{\pi^2 m^2} \sin^2(\pi m a) \sin^2(\pi(n - n_0)d/\lambda) \quad \text{(Equation 1)}$$

Here, m denotes the order of diffraction, T denotes the period of a diffraction pattern 25, $n_0$ denotes the refractive index of air, n denotes the refractive index of a grating, d denotes the depth of the diffraction pattern 25, and λ denotes the wavelength of a light source. The efficiency of diffraction of the conventional grating and the efficiency of diffraction of the first and second gratings 7 and 8 according to the present invention are calculated by using the Equation 1. Constant values used in the calculation of the efficiency of diffraction are shown in Table 1.

TABLE I

|   | CD | DVD |
|---|---|---|
| a | 0.5 | 0.5 |
| n | 1.5111 | 1.5145 |
| $n_0$ | 1 | 1 |
| λ | 0.78 | 0.65 |

Figure 5:
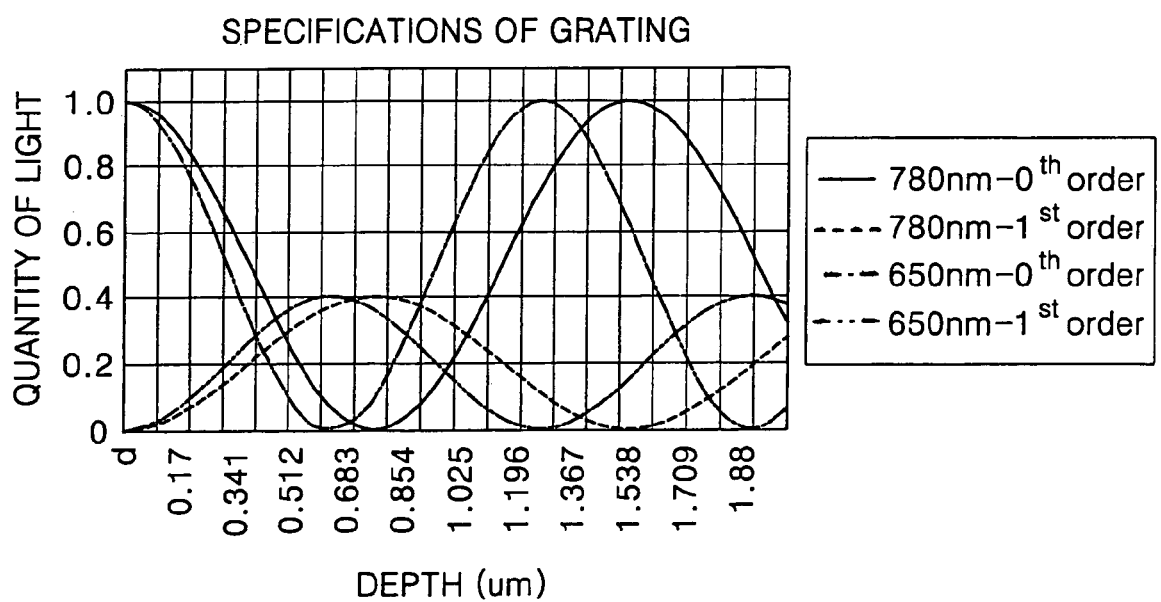
FIG. 5 is a graph showing a change in the quantity of light according to a depth of a pattern, by a wavelength of a light source, in a grating used in the optical pickup apparatus of FIG. 3.

In the present invention, the efficiency of diffraction is changed by, for example, changing the depth d of the pattern of a grating. Here, the Equation 1 is calculated by substituting ½ for a, and FIG. 5 shows a change in the quantity of light according to a change in the depth d of the pattern of the grating. An optimal depth d of the first and second gratings 7 and 8 adopted in the optical pickup apparatus according to the present invention can be determined from the graph of FIG. 5.

Since the first and second gratings 7 and 8 are arranged on the optical path between the light source module 1 and the beam splitter 10, a first light beam I and a second light beam 11 emitted from the first and second light sources 3 and 5, respectively, all pass through the first and second gratings 7 and 8. Here, the first and second gratings 7 and 8 selectively divide light corresponding thereto into three beams and transmit 90% or more with respect to the other light.

In detail, where the first light source 3, for example, a laser diode for a DVD, is used, the first light beam I passing through the first grating 7 is divided into three beams, that is, a $-1^{st}$ order light beam, a $0^{th}$ order light beam, and a $+1^{st}$ order light beam in a ratio of 1:5:1. Where the divided first light beam I passes through the second grating 8, 90% or more, for example, 95%, of the light passes through the second grating 8.

Where the second light source 5, for example, a laser diode for a CD, is used, 90% or more, for example, 95%, of the second light beam 11 passes through the first grating 7. The second light beam 11 passing through the second grating 8 is divided into three beams, that is, a $-1^{st}$ order light, a $0^{th}$ order light, and a $+1^{st}$ order light in a ratio of 1:5:1.

The depth d of the pattern of a grating satisfying the above conditions is obtained with reference to the graph of FIG. 5.

TABLE 2

| Grating of the present invention | d (depth) | 650 nm | | | 780 nm | | |
|---|---|---|---|---|---|---|---|
| | | $0^{th}$ order | $1^{st}$ order | Ratio of 0:1 | $0^{th}$ order | $1^{st}$ order | Ratio of 0:1 |
| 650 nm | 1.51 μm | 67.1% | 13.37% | 5:1 | 99.88% | 0.05% | — |
| 780 nm | 1.23 μm | 99.3% | 0.3% | — | 67.1% | 13.35% | 5:1 |

According to Table 2, the depth d of the pattern of the first grating 7 and the depth d of the pattern of the second grating 8 may be set to 1.51 μm and 1.23 μm, respectively.

The diffraction efficiency ratio according to the depth d of a pattern of a grating, where conventional gratings for a CD and a DVD are arranged along different optical paths, is shown in Table 3 to compare with the grating of the present invention.

TABLE 3

| Conventional grating | d (depth) | 650 nm | | | 780 nm | | |
|---|---|---|---|---|---|---|---|
| | | $0^{th}$ order | $1^{st}$ order | Ratio of 0:1 | $0^{th}$ order | $1^{st}$ order | Ratio of 0:1 |
| 650 nm | 0.246 μm | 67.1% | 13.37% | 5:1 | 76.5% | 9.5% | 8:1 |
| 780 nm | 0.297 μm | 54.7% | 18.4% | 3:1 | 67.1% | 13.36% | 5:1 |

Figure 6:
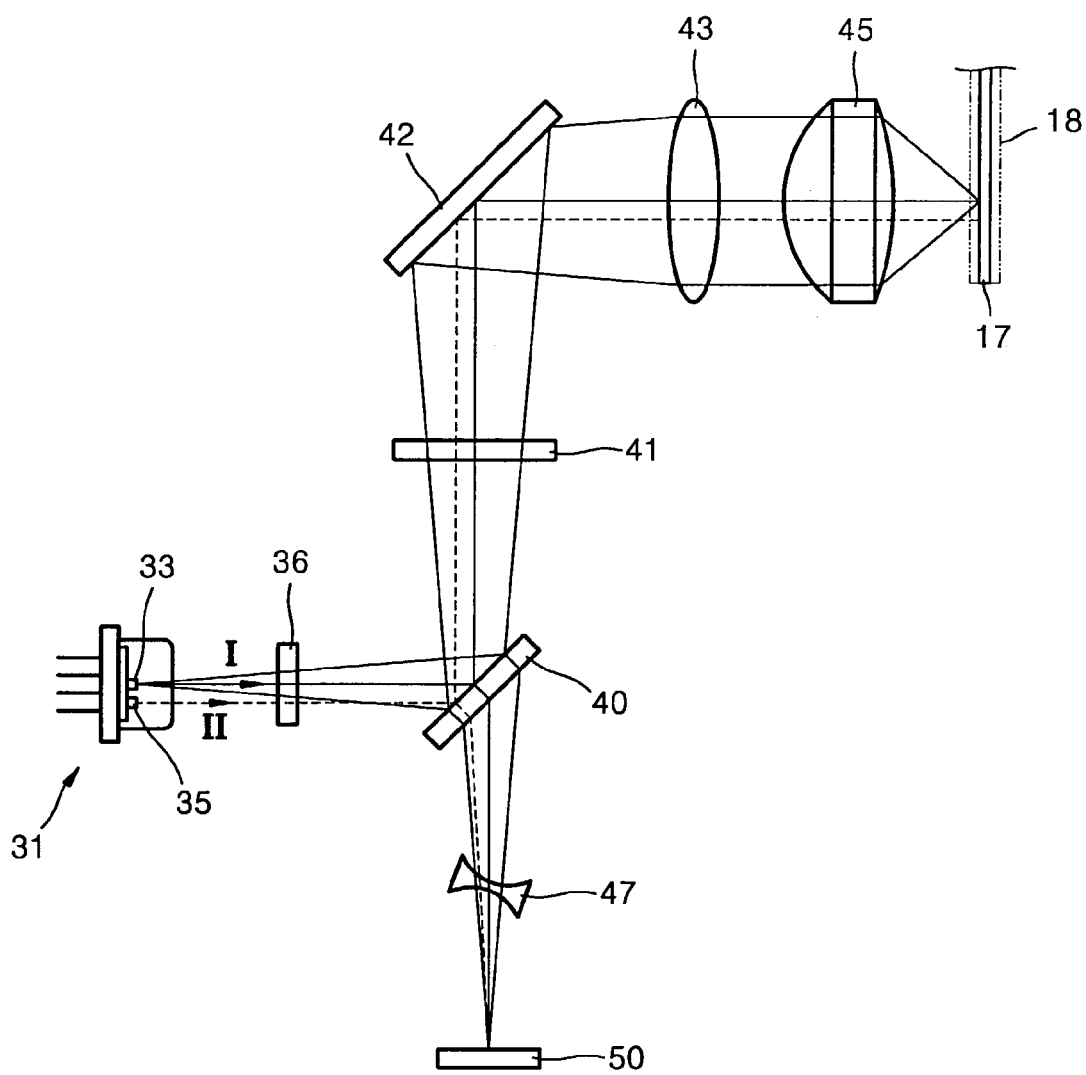
FIG. 6 is a view illustrating the configuration of an optical pickup apparatus according to another embodiment of the present invention.

In the present invention, a structure that is different from a conventional optical pickup is presented, as the first and second light sources 3 and 5 are formed into a single module, and the corresponding first and second gratings 7 and 8 are arranged along the same optical path. Here, although the first and second gratings 7 and 8 are independently formed, it is understood that the first and second gratings 7 and 8 may be integrally formed (as shown in FIG. 6). Thus, the number of parts in the optical pickup apparatus of the present invention can be reduced by forming light sources for light beams having different wavelengths into a single module and integrating gratings into a single multi-purpose grating.

Each of the light beams corresponding to the first and second light sources 3 and 5 is divided into three beams, reflected by the disc 17 or 18, and detected by the photodetector 23. By using the detected three beams, a tracking error detection and a focus error detection are performed, which will be described below.

The light beams reflected by the beam splitter 10 proceed to the objective lens 15. A collimating lens 13 may be provided, as shown in FIG. 3, before the objective lens 15 to make the light beams parallel. The light beams are focused by the objective lens 15 onto the disc 17 or 18. Accordingly, the optical pickup apparatus according to the present invention can be compatibly used for both the relatively thin disc 17, for example, a DVD, and the relatively thick disc 18, for example, a CD.

The light beams reflected by the disc 17 or 18, passing through the objective lens 15 and the collimating lens 13, and transmitted by the beam splitter 10 are converted into electrical signals by the photodetector 23.

Here, a concave lens or an astigmatism lens 20 can be provided, as shown in FIG. 3, between the beam splitter 10 and the photodetector 23. Where the concave lens or the astigmatism lens 20 is not provided, the size of a light spot formed on the photodetector 23 can be adjusted by controlling the thickness of the beam splitter 10. Where the concave lens or the astigmatism lens 20 is provided, the size of a light spot can be adjusted by changing the focal distance of the concave lens or the astigmatism lens 20.

FIG. 6 shows an optical pickup apparatus according to another embodiment of the present invention. The optical pickup apparatus includes an optical module 31 having a first light source 33 and a second light source 35, which emit light beams having different wavelengths and are integrally formed into a single module, a polarizing beam splitter 40 which transmits or reflect a light beam emitted from the light source module 31 according to a polarization direction, a ¼ wave plate 41 which changes a polarization state of the light beam whose optical path is changed by the polarizing beam splitter 40, an objective lens 45 which focuses the light beam passing through the ¼ wave plate 41 onto the disc 17 or 18, and a photodetector 43 which receives the light beam reflected by the disc 17 or 18 and passing through the objective lens 45, the ¼ wave plate 41, and the polarizing beam splitter 40.

The optical pickup apparatus according to the present invention can be compatibly used, as a compatible optical pickup apparatus, for discs having different thickness. In other words, the present optical pickup apparatus can be used for both discs 17 and 18 formed of a relatively thin disc, for example, a DVD, and a relatively thick disc, for example, a CD.

The optical module 31 is manufactured by incorporating the first light source 33 which emits a first light beam I and the second light source 35 which emits a second light beam 11 having a different wavelength from that of the first light beam I into a single package. The first light source 33 is, for example, a laser diode which emits a light beam having a wavelength of, for example, 650 nm to read the relatively thin disc 17. The second light source 35 is, for example, a laser diode which emits a light beam having a wavelength of, for example, 780 nm to read the relatively thick disc 18.

A multi-purpose grating 36 is provided on an optical path between the light source module 31 and the polarizing beam splitter 40. The multi-purpose grating 36 can be used for both of the first and second light sources 33 and 35.

Figure 7:
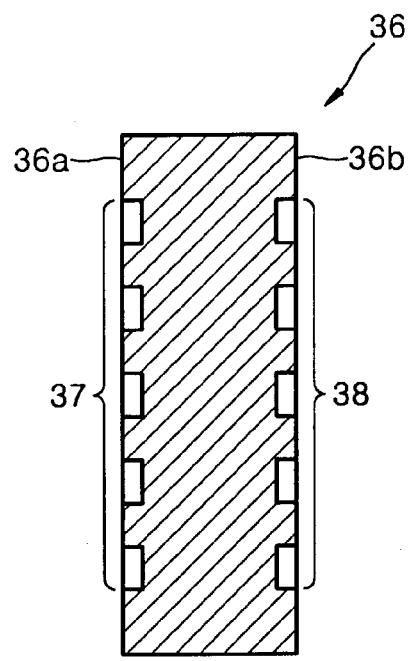
FIG. 7 is an enlarged sectional view of a multi-purpose grating adopted in the optical pickup apparatus of FIG. 6.

FIG. 7 shows an enlarged view of the multi-purpose grating 36. A first pattern 37 which divides the light beam emitted from the first light source 33 into three beams and simultaneously transmits 90% or more of the light beam emitted from the second light source 35 is formed on a surface 36a of the multi-purpose grating 36. A second pattern 38 which transmits 90% or more of the light beam emitted from the first light source 33 and simultaneously divides the light beam emitted from the second light source 35 into three beams is formed on another surface 36b of the multi-purpose grating 36. The above conditions are similar to those adopted in the first and second gratings 7 and 8 of FIG. 3. Here, it is a characteristic that the multi-purpose grating 36 is integrally formed of the first grating 7 and the second grating 8. By forming an integral multi-purpose grating, the number of parts used in the optical pickup apparatus can be further reduced.

Referring back to Table 2, the depth d of the first pattern 37 is 1.51 μm and the depth d of the second pattern 38 is 1.23 μm. Alternatively, the opposite formation is possible. Thus, the gratings for a CD and a DVD can be formed integrally.

Referring back to FIGS. 6 and 7, where the light beam emitted from the first light source 33 passes through the surface 36a of the multi-purpose grating 36, the light beam is divided into three beams, that is, into $-1^{st}$ order, $0^{th}$ order, and $+1^{st}$ order light beams in a ratio of 1:5:1. Then, 90% or more, for example, 95% or more, of the above divided light beams is transmitted while passing through the another surface 36b of the grating 36.

Where the light beam emitted from the second light source 35 passes through the surface 36a of the multi-purpose grating 36, 90% or more, for example, 95% or more, of the above light beam is transmitted. Then, where the above light beam passes through the another surface 36b of the grating 36, the light beam is divided into three beams, that is, into $-1^{st}$ order, $0^{th}$ order, and $+1^{st}$ order light beams in a ratio of 1:5:1.

A light beam divided into three beams by the multi-purpose grating 36 is incident upon the polarizing beam splitter 40. The polarizing beam splitter 40 reflects or transmits the incident light according to a direction in which the incident light is polarized. For example, the polarizing beam splitter 40 transmits a P polarized beam and reflects an S polarized beam and vice versa. By using the above feature, most of the light beam emitted from the light source module 31 can be reflected to proceed toward the ¼ wave plate 41. Here, the polarizing beam splitter 40 can be formed to reflect 95% or more of the light beam emitted from the light source.

Where the light beam passes through the ¼ wave plate 41, the state of polarization of the incident light changes. For example, where it is assumed that a light beam of an S polarization is emitted from the light source module 31, as the light beam passes through the ¼ wave plate 41, the polarization of the light beam changes to a circular polarization. The light beam having the changed polarization passes through the objective lens 45 and is focused on the disc 17 or 18. As the light beam reflected by the disc 17 or 18 passes through the ¼ wave plate 41, the polarization of the light beam changes to a P polarization. Thus, 95% or more of the S polarization beam is first reflected by the polarizing beam splitter 40. Then, 95% or more of the P polarization beam reflected by the disc 17 or 18, and proceeding backward, passes through the polarizing beam splitter 40 and proceeds toward the photodetector 43. Where the P polarization beam is emitted from the light source module 31, the same method can be adopted. Thus, by adopting the polarizing beam splitter 40 and the ¼ wave plate 41, most of the light beam emitted from the light source module 31 can be used as an effective light so as to improve the efficiency of light.

The light beam emitted from the light source module 31 is incident upon the disc 17 or 18 as a circular polarization beam by the ¼ wave plate 41, regardless of whether the light beam is a P polarization or S polarization. Since the circular polarization beam has a stronger overcoming force to a birefringence than a linearly polarized beam, the ¼ wave plate 41 assists in increasing a corresponding force to a disk having a large birefringence.

A reflection mirror 42, and a collimating lens 43 which makes the light beam parallel can be provided between the ¼ wave plate 41 and the disc 17 or 18, as shown in FIG. 6. Here, by using the reflection mirror 42 to change an optical path of the light beam perpendicular, the overall thickness of the optical pickup apparatus can be reduced, so as to produce a slim optical pickup apparatus. Also, a lens 47 such as a concave lens or astigmatism lens can be provided between the polarizing beam splitter 40 and the photodetector 50, as shown in FIG. 6.

As described above, since the light source module 31 and the multi-purpose grating 36 are provided in the optical pickup apparatus, the overall number of parts of the optical pickup apparatus can be reduced. Also, the efficiency of light can be maximized by using the polarizing beam splitter 40 and the ¼ wave plate 41. Thus, while an additional high frequency apparatus is adopted by a conventional single mode laser diode, for a DVD, to increase the quantity of light, such a high frequency apparatus is not needed in the present invention. Since the efficiency of light of a light source is maximized in the present invention, where a multi-mode laser diode is used, a sufficient quantity of light can be secured.

The light beam reflected by the disc 17 or 18 passes through the objective lens 45, the ¼ wave plate 41 and the polarizing beam splitter 40, and is received by a photodetector 50.

The following description about the photodetector 50 can be commonly applied to photodetectors 23 of FIG. 3.

In the light source modules 1 and 31, since the first light sources 3 and 23 and the second light sources 5 and 35 are separated by about (110±2)μm from each other, respectively, the optical axes are matched. Thus, each of the photodetectors 23 and 50 includes a first photodetector corresponding to the first light source 3/23 and a second photodetector corresponding to the second light source 5/35.

FIGS. 8A through 8E show examples of the photodetector 23/50 adopted in the present invention.

Figure 8A:
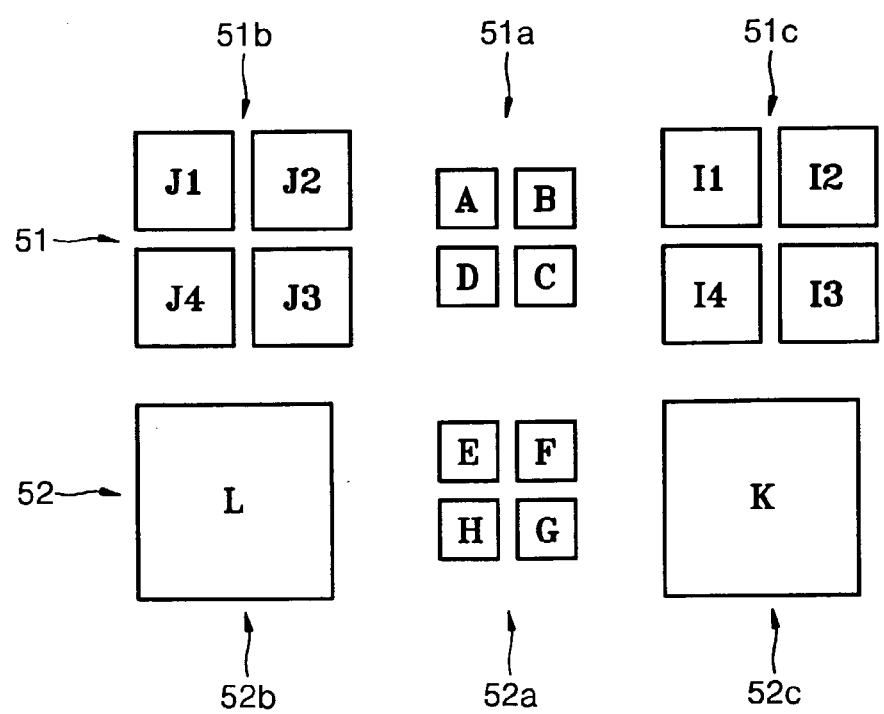
FIGS. 8A through 8E are views showing various examples of a photodetector adopted in an optical pickup apparatuses according to the present invention.

As shown in FIG. 8A, a first photodetector 51 is formed of a main detector 51a having a main four-division structure and a pair of sub-photodetectors 51b and 51c, each having a sub four-division structure, arranged at both sides of the main photodetector 51a. Three beams diffracted by the gratings 7 and 8, or the grating 36 are detected by the first photodetector 51 so as to perform a servo tracking and a servo focusing. The first photodetector 51 can be used for a DVD.

Here, a differential push-pull (DPP) method can be used to detect a tracking error. A tracking error detection signal (TES) is obtained as follows:

$$TES=((A+D)-(B+C))-G(((J1+J4)(I1+I4))-((J2+J3)+(I2+I3))) \quad \text{(Equation 2)}$$

In the above equation, G is a gain applied to a detection signal of the sub-photodetectors 51b and 51c to detect an optimal tracking error signal, since the quantity of light of the sub-photodetectors 51b and 51c is smaller than that of the main photodetector 51a. The gain G can be determined according to a ratio of the quantity of light between the $0^{th}$ order light beam and the 1$^{st}$ order light beam which are diffracted. A signal is amplified by the differential push-pull method.

On the other hand, a differential astigmatism method can be used to detect a focusing error, and a focusing error detection signal (FES) is obtained as follows:

$$FES=((A+C)-(B+D))+G(((J1+J3)(I1+I3))-((J2+J4)+(I2+I4)))$$ (Equation 3)

Here, for example, where the first photodetector 51 is applied to a DVD-RAM disc, since pits are formed in a groove and land portion, during a focusing, noise is generated not only to a main beam received by the main photodetector 51a, but also to a side beam received by the sub-photodetectors 51b and 51c. It is desired that the focusing is not influenced by the pits. A phase difference of 180° is formed between the main beam and the side beam, and the effect by the pits can be reduced by adding the main beam to the side beam.

Referring back to FIG. 8A, a second photodetector 52 is formed of a second main photodetector 52a having a second four-division structure and second sub-photodetectors 52b and 52c arranged at both sides of the second main photodetector 52a. The second photodetector 52 can be used for a CD.

A tracking error detection signal (TES) and a focusing error detection signal (FES) are obtained as follows in a three beam method and n astigmatism method, respectively:

$$TES=L-K$$ (Equation 4a)

$$FES=((E+H)-(F+G))$$ (Equation 4b)

Figure 8B:
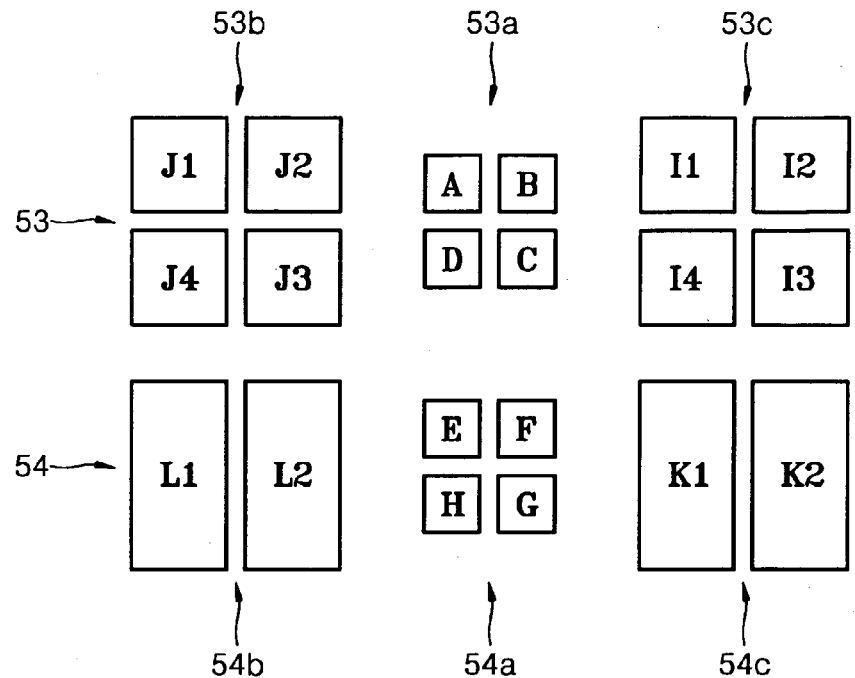

In FIG. 8B, a first photodetector 53 is formed of a main photodetector 53a having a main four-division structure and sub-photodetectors 53b and 53c, each having a sub four-division structure, arranged at both sides of the main photodetector 53a. The configuration of the first photodetector 53 is the same as that of the first photodetector 51 of FIG. 8A, and the tracking error detection signal and the focusing error detection signal are detected in the same manner using the equations 2 and 3.

A second photodetector 54 is formed of a second main photodetector 54a having a second four-division structure and second sub-photodetectors 54b and 54c, each having two-division structure, arranged at both sides of the second main photodetector 54a. A focusing error detection signal (FES) and a tracking error detection signal (TES) are obtained by the following equations:

$$FES=(E+G)-(F+H)$$ (Equation 5a)

$$TES=((E+H)-(F+G))-G((L1+K1)-(L2+K2))$$ (Equation 5b)

Figure 8C:
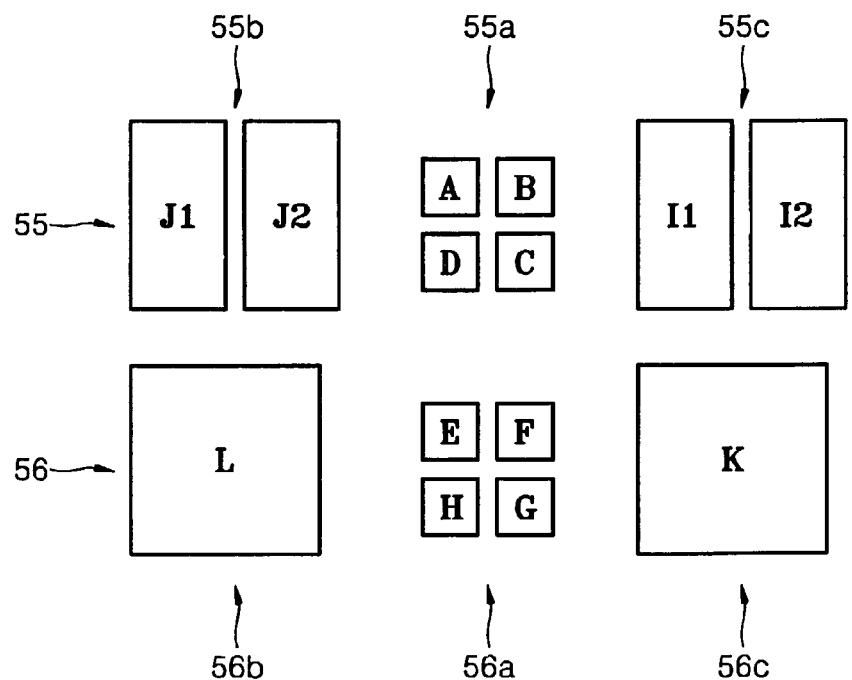

In FIG. 8C, a first photodetector 55 is formed of a main photodetector 55a having a four-division structure and sub-photodetectors 55b and 55c, each having a two-division structure, arranged at both sides of the main photodetector 55a. A second photodetector 56 is formed of a second main photodetector 56a having a second four-division structure and second sub-photodetectors 56b and 56c arranged at both sides of the second main photodetector 55a. The second photodetector 56 has the same configuration as that of the second photodetector 52 of FIG. 8A. For the first photodetector 55, a focusing error detection signal (FES) and a tracking error detection signal (TES) are obtained by the following equations:

$$TES=((A+D)-(B+C))-G((J1+I1)-(J2+I2))$$ (Equation 6a)

$$FES=(A+C)-(B+D)$$ (Equation 6b)

Figure 8D:
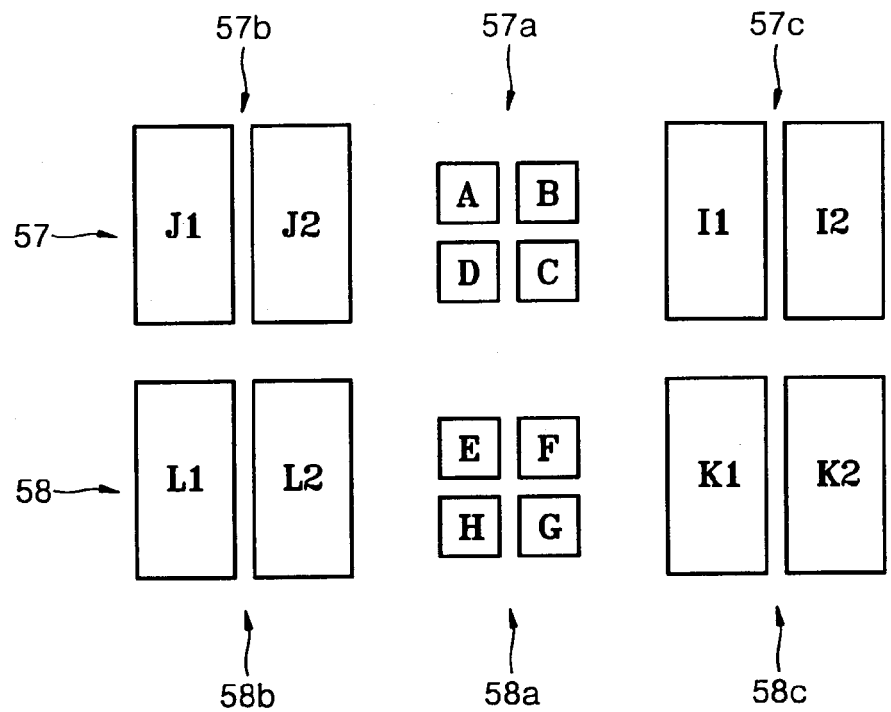

In FIG. 8D, a first photodetector 57 is formed of a main photodetector 57a having a four-division structure and sub-photodetectors 57b and 57c, each having a two-division structure, arranged at both sides of the main photodetector 57a. A second photodetector 58 is formed of a second main photodetector 58a having a second four-division structure and second sub-photodetectors 58b and 58c, each having a second two-division structure, arranged at both sides of the second main photodetector 58a. Here, the first photodetector 57 can obtain a focusing error detection signal and a tracking error detection signal by using the Equations 6a and 6b, while the second photodetector 58 can obtain a focusing error detection signal and a tracking error detection signal by using the Equations 5a and 5b.

Figure 8E:
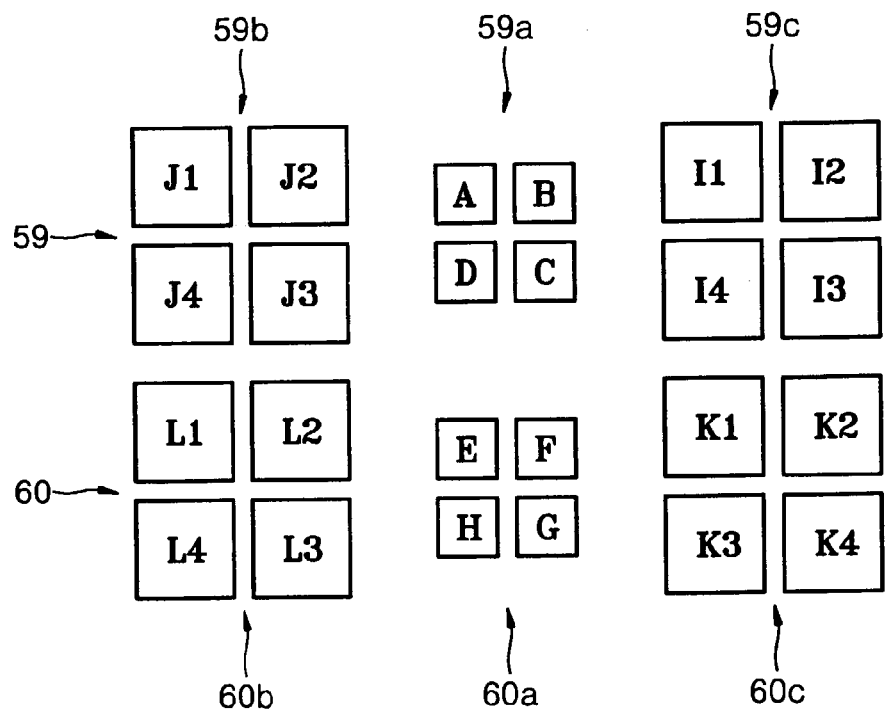

In FIG. 8E, a first photodetector 59 is formed of a main photodetector 59a having a main four-division structure and sub-photodetectors 59b and 59c, each having a sub four-division structure, arranged at both sides of the main photodetector 59a. A second photodetector 60 is formed of a second main photodetector 60a having a second main four-division structure and second sub-photodetectors 60b and 60c, each having a second sub four-division structure, arranged at both sides of the second main photodetector 60a. The first and second photodetectors 59 and 60 have substantially the same structure. A tracking error detection signal can be obtained in a differential push-pull method, and a focusing error detection signal can be obtained in a differential astigmatism method. The first photodetector 59 can perform a tracking error detection and a focusing error detection by using the Equations 2 and 3.

The second photodetector 60 can obtain a tracking error detection signal (TES) and a focusing error detection signal FES as follows:

$$TES=((E+H)-(F+G))-G(((L1+L4)+(K1+K4))-((L2+L3)+(K2+K3)))$$ (Equation 7a)

$$FES=((E+G)-(F+H))+G(((L1+L3)+(K1+K3))-((L2+L4)+(K2+K4)))$$ (Equation 7b)

The present invention includes a first photodetector corresponding to a first light source and a second photodetector corresponding to a second light source. The first photodetectors 51, 53, 55, 57, and 59 shown in FIGS. 8A through 8E can be used for, for example, a DVD, and the second photodetectors 52, 54, 56, 58, and 60 can be used for, for example, a CD.

An optical pickup apparatus according to the present invention includes a light source module in which first and second light sources that emits light beams having different wavelengths are formed into a single module. Accordingly, the number of parts of the optical pickup apparatus can be drastically reduced. By reducing the number of parts, the productivity is improved, and the reliability is improved as the deterioration of performance, due to a deterioration of a bonding of the parts during a high temperature operation, is reduced.

Additionally, the present invention includes gratings suitable for the light source module of two wavelengths, or an integral grating for both the first and second light beams. This further reduces the number of parts of the optical pickup apparatus. Thus, the structure of the present optical pickup apparatus is simplified, the assembly thereof is made easy and the production cost thereof is reduced.

Also, by providing first and second photodetectors which correspond to the first and second light sources, and using a differential push-pull method and a differential astigmatism method, a signal for a recordable disc having a low reflectance is amplified, thereby allowing a servo tracking and a servo focusing to be efficiently performed.

Furthermore, by maximizing the efficiency of light using a polarizing beam splitter and a ¼ wave plate, where a multi-mode laser diode is used as a light source, recording/reproduction is possible with respect to a disc such as a DVD-RW, DVD-RAM, DVD-R and DVD+RW which are recordable discs having a low reflectance. Also, since a light beam reflected back to the light source module from the polarizing beam splitter hardly exists, a laser light source is stable. The laser light source can be driven with a particular quantity of light. Either a single mode laser diode or a multi-mode laser diode can be used as a light source.

In addition, since a circular polarization light beam is input to a disc by the ¼ wave plate, a corresponding force to a disc having a large birefringence can be improved.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An optical pickup apparatus for recording/reproducing with respect to a disc, comprising:
    a light source module which emits a light beam, wherein the light source module includes a first light source and a second light source that emit first and second light beams having different wavelengths and are formed into a single module;
    a first grating which divides the first light beam emitted from the first light source and transmits the second light beam emitted from the second light source;
    a second grating which transmits the first light beam emitted from the first light source and divides the second light beam emitted from the second light source;
    a beam splitter which reflects or transmits the light beam emitted from the light source module;
    an objective lens which focuses the light beam passing through the beam splitter onto the disc; and
    a photodetector which receives and detects the light beam reflected by the disc,
    wherein the photodetector comprises a first photodetector which detects the first light beam and a second photodetector which detects the second light beam,
    the first and second gratings divide the corresponding first and second light beams into three beams of the first light beam and three beams of the second light beam, and
    the first photodetector comprises a main photodetector having a main four-division structure and sub-photodetectors, each having a sub four-division structure, arranged at both sides of the main photodetector,
    the first photodetector detects a tracking error detection signal (TES) and a focusing error detection signal (FES) with respect to the disc, using a differential push-pull (DPP) method and a differential astigmatism method, respectively, using the four detection signals of the main photodetector and the eight detection signals of the sub-photodetectors, and
    the TES and FES satisfy the following relationships:

$TES=((A+D)-(B+C))-G(((J1+J4)(I1+I4))-((J2+J3)+(I2+I3)))$ $FES=((A+C)-(B+D))+G(((J1+J3)(I1+I3))-((J2+J4)+(I2+I4)))$ where A, B, C and D correspond to detection signals of the main photodetector, I1, I2, I3 and I4, and J1, J2, J3 and J4 correspond to detection signals of the sub-photodetectors, and G is a gain applied to the sub-photodetectors.

2. The optical pickup apparatus as claimed in claim 1, wherein the first and second gratings are integrally formed as an integral grating.

3. The optical pickup apparatus as claimed in claim 2, further comprising a collimating lens which makes the light beam parallel, and is provided between the beam splitter and the objective lens.

4. The optical pickup apparatus as claimed in claim 2, wherein a depth of a pattern of the first grating is 1.51 μm and a depth of a pattern of the second grating is 1.23 μm.

5. The optical pickup apparatus as claimed in claim 2, wherein the first light source emits the first light beam having a wavelength of 650 nm or more, and the second light source emits the second light beam having a wavelength that is longer than that of the first light beam.

6. The optical pickup apparatus as claimed in claim 2, further comprising one of an astigmatism lens and a concave lens, which is provided on an optical path between the beam splitter and the photodetector.

7. An optical pickup apparatus for recording/reproducing with respect to a disc, comprising:
    a light source module which emits a light beam, wherein the light source module includes a first light source and a second light source that emit first and second light beams having different wavelengths and are formed into a single module;
    a first grating which divides the first light beam emitted from the first light source and transmits the second light beam emitted from the second light source;
    a second grating which transmits the first light beam emitted from the first light source and divides the second light beam emitted from the second light source;
    a polarizing beam splitter which selectively reflects or transmits the light beam emitted from the light source module according to a direction in which the light beam is polarized;
    a ¼ wave plate which converts a polarization of the light beam passing through the polarizing beam splitter;
    an objective lens which focuses the light beam passing through the ¼ wave plate onto the disc; and
    a photodetector which receives and detects the light beam reflected by the disc,
    wherein the photodetector comprises a first photodetector which detects the first light beam and a second photodetector which detects the second light beam,
    the first and second gratings divide the corresponding first and second light beams into three beams of the first light beam and three beams of the second light beam, and
    the first photodetector comprises a main photodetector having a four-division structure and sub-photodetectors, each having a two-division structure, arranged at both sides of the main photodetector,
    the second photodetector comprises a second main photodetector having a second four-division structure and second sub-photodetectors, each having a second two-division structure, arranged at both sides of the second main photodetector,
    the second photodetector detects a tracking error detection signal (TES) and a focusing error detection signal (FES) with respect to the disc, using the four detection signals of the second main photodetector and the four detection signals of the second sub-photodetectors, and the TES and FES satisfy the following relationships:

$$TES=((E+H)-(F+G))-G((L1+K1)-(L2+K2))$$

$$FES=(E+G)-(F+H)$$

where E, F, G and H correspond to detection signals of the second main photodetector, and L1, L2, K1 and K2 correspond to detection signals of the second sub-photodetectors, and G is a gain applied to the second sub-photodetectors.

8. The optical pickup apparatus as claimed in claim 7, wherein the first and second gratings are integrally formed as an integral grating.

9. The optical pickup apparatus as claimed in claim 8, further comprising a collimating lens which makes the light beam parallel, and is provided between the polarizing beam splitter and the objective lens.

10. The optical pickup apparatus as claimed in claim 8, wherein a depth of a pattern of the first grating is 1.51 μm and a depth of a pattern of the second grating is 1.23 μm.

11. The optical pickup apparatus as claimed in claim 7, further comprising a collimating lens which makes the light beam parallel, and is provided between the polarizing beam splitter and the objective lens.

12. The optical pickup apparatus as claimed in claim 7, wherein a depth of a pattern of the first grating is 1.51 μm and a depth of a pattern of the second grating is 1.23 μm.

13. The optical pickup apparatus as claimed in claim 1, further comprising:
a collimating lens which makes the light beam parallel, and is provided between the beam splitter and the objective lens; and
one of an astigmatism lens and a concave tens, which is provided on an optical path between the beam splitter and the photodetector.

14. The optical pickup apparatus as claimed in claim 1, wherein the first and second light sources are arranged apart from each other by 110±2 μm.

15. The optical pickup apparatus as claimed in claim 1, wherein:
the first grating transmits 90% or more of the second light beam, and
the second grating transmits 90% or more of the first light beam.

16. An optical pickup apparatus for recording/reproducing with respect to a disc, comprising:
a light source module which emits a light beam, wherein the light source module includes a first light source and a second light source that emit first and second light beams having different wavelengths and are formed into a single module;
a first grating which divides the first light beam emitted from the first light source and transmits the second light beam emitted from the second light source;
a second grating which transmits the first light beam emitted from the first light source and divides the second light beam emitted from the second light source;
a beam splitter which reflects or transmits the light beam emitted from the light source module;
an objective lens which focuses the light beam passing through the beam splitter onto the disc; and
a photodetector which receives and detects the light beam reflected by the disc,
wherein the photodetector comprises a first photodetector which detects the first light beam and a second photodetector which detects the second light beam,
the first and second gratings divide the corresponding first and second light beams into three beams of the first light beam and three beams of the second tight beam,
the first photodetector comprises a main photodetector having a main four-division structure and sub-photodetectors, each having a sub four-division structure, arranged at both sides of the main photodetector,
the second photodetector comprises a second main photodetector having a second main four-division structure and second sub-photodetectors, each having a two-division structure, arranged at both sides of the main photodetector,
the second photodetector detects a tracking error detection signal (TES) and a focusing error detection signal (FES) with respect to the disc, and
the TES and FES satisfy the following relationships:

$$TES=((E+H)-(F+G))-G((L1+K1)-(L2+K2))$$

$$FES=(E+G)-(F+H)$$

where E, F, G and H correspond to detection signals of the second main photodetector, and L1, L2, K1 and K2 correspond to detection signals of the second sub-photodetectors, and G is a gain applied to the second sub-photodetectors.

17. An optical pickup apparatus for recording/reproducing with respect to a disc, comprising:
a light source module which emits a light beam, wherein the light source module includes a first light source and a second light source that emit first and second light beams having different wavelengths and are formed into a single module;
a first grating which divides the first light beam emitted from the first light source and transmits the second light beam emitted from the second light source;
a second grating which transmits the first light beam emitted from the first light source and divides the second light beam emitted from the second light source;
a beam splitter which reflects or transmits the light beam emitted from the light source module;
an objective lens which focuses the light beam passing through the beam splitter onto the disc; and
a photodetector which receives and detects the light beam reflected by the disc,
wherein the photodetector comprises a first photodetector which detects the first light beam and a second photodetector which detects the second light beam,
the first and second gratings divide the corresponding first and second light beams into three beams of the first light beam and three beams of the second light beam,
the first photodetector comprises a main photodetector having a main four-division structure and sub-photodetectors, each having a sub four-division structure, arranged at both sides of the main photodetector,
the second photodetector comprises a second main photodetector having a second main four-division structure and second sub-photodetectors, each having a two-division structure, arranged at both sides of the main photodetector,
the second photodetector detects a tracking error detection signal (TES) and a focusing error detection signal (FES) with respect to the disc, and the TES and FES satisfy the following relationships:

$$TES=((E+H)-(F+G))-G(((L1+L4)+(K1+K4))-((L2L3)+(K2+K3)))$$

$$FES=((E+G)-(F+H))+G(((L1+L3)+(K1+K3))-((L2L4)+(K2+K4)))$$

where E, F, G and H correspond to detection signals of the second main photodetector, and L1, L2, L3 and L4, and K1, K2, K3 and K4 correspond to detection signals of the second sub-photodetectors, and G is a gain applied to the second sub-photodetectors.

18. An optical pickup apparatus for recording/reproducing with respect to a disc, comprising:
a light source module which emits a light beam, wherein the light source module includes a first light source and a second light source that emit first and second light beams having different wavelengths and are formed into a single module;
a first grating which divides the first light beam emitted from the first light source and transmits the second light beam emitted from the second light source;
a second grating which transmits the first light beam emitted from the first light source and divides the second light beam emitted from the second light source;
a beam splitter which reflects or transmits the light beam emitted from the light source module;
an objective lens which focuses the light beam passing through the beam splitter onto the disc; and
a photodetector which receives and detects the light beam reflected by the disc,
wherein the photodetector comprises a first photodetector which detects the first light beam and a second photodetector which detects the second light beam,
the first and second gratings divide the corresponding first and second light beams into three beams of the first light beam and three beams of the second light beam, and
the first photodetector comprises a main photodetector having a four-division structure and sub-photodetectors, each having a two-division structure, arranged at both sides of the main photodetector,
the first photodetector detects a tracking error detection signal (TES) and a focusing error detection signal (FES) with respect to the disc, and
the TES and FES satisfy the following relationships:

$$TES=((A+D)-(B+C))-G((J1+I1)-(J2+I2))$$

$$FES=(A+C)-(B+D)$$

where A, B, C and D correspond to detection signals of the main photodetector, I1, I2, J1 and J2 correspond to detection signals of the sub-photodetectors, and G is a gain applied to the sub-photodetectors.

19. The optical pickup apparatus as claimed in claim 1, wherein the optical pickup apparatus is a compatible optical pickup apparatus which records/reproduces data with respect to a DVD and a CD.

20. The optical pickup apparatus as claimed in claim 1, wherein the first light source is one of a single mode laser diode and a multi-mode laser diode.

* * * * *

UNITED STATES PATENT AND TRADEMARK OFFICE
CERTIFICATE OF CORRECTION

PATENT NO. : 7,180,838 B2  Page 1 of 1
APPLICATION NO. : 10/389933
DATED : February 20, 2007
INVENTOR(S) : Young-sun Park et al.

It is certified that error appears in the above-identified patent and that said Letters Patent is hereby corrected as shown below:

Column 15, Line 35, change "tens," to --lens,--.

Column 16, Line 6, change "tight" to --light--.

Column 17, Line 3, change "((L2L3))" to --((L2+L3)--.

Column 17, Line 6, change "((L2L4)" to --((L2+L4)--.

Signed and Sealed this

Twelfth Day of June, 2007

JON W. DUDAS
*Director of the United States Patent and Trademark Office*